United States Patent
Yin et al.

(10) Patent No.: US 9,338,230 B2
(45) Date of Patent: May 10, 2016

(54) METHOD, NETWORK ENTITY AND NETWORK SYSTEM FOR FORWARDING RESOURCES

(75) Inventors: Yue Yin, Shenzhen (CN); Xiaoqing Dong, Shenzhen (CN); Lei Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 583 days.

(21) Appl. No.: 12/793,189

(22) Filed: Jun. 3, 2010

(65) Prior Publication Data

US 2010/0241750 A1  Sep. 23, 2010

Related U.S. Application Data

(63) Continuation of application No. PCT/CN2008/073552, filed on Dec. 17, 2008.

(30) Foreign Application Priority Data

Dec. 18, 2007  (CN) .......................... 2007 1 0032671

(51) Int. Cl.
G06F 15/16 (2006.01)
H04L 29/08 (2006.01)
(Continued)

(52) U.S. Cl.
CPC .............. *H04L 67/104* (2013.01); *H04L 45/00* (2013.01); *H04L 45/34* (2013.01); *H04L 45/50* (2013.01); *H04L 45/502* (2013.01); *H04L 67/327* (2013.01)

(58) Field of Classification Search
CPC ....... H04L 45/34; H04L 45/50; H04L 45/502; H04L 45/00; H04L 67/104; H04L 67/327
USPC .................... 709/206, 224; 370/255
See application file for complete search history.

(56) References Cited

U.S. PATENT DOCUMENTS 6,310,889 B1 * 10/2001 Parsons et al. ................ 370/466
6,505,236 B1 *  1/2003 Pollack .......................... 709/206
(Continued)

FOREIGN PATENT DOCUMENTS

CN        1771702 A    5/2006
CN      101022304 A    8/2007
(Continued)

OTHER PUBLICATIONS

First Chinese Office Action dated (mailed) Jun. 9, 2011, issued in related Chinese Application No. 200710032671.6 Huawei Technologies Co., LTD.
(Continued)

*Primary Examiner* — Krista Zele
*Assistant Examiner* — Anthony Fabbri
(74) *Attorney, Agent, or Firm* — Brinks Gilson & Lione (57) ABSTRACT

A method for forwarding resources is provided, which includes the following steps. Content-based routing is performed between a resource request entity and a resource providing entity according to a resource identifier. Information indicating content-based forwarding is generated on an intermediate route entity during routing. A resource-content-based forward path is created between the resource request entity and the resource providing entity. The resource requested by the resource request entity is sent to the resource request entity by the forward path created based on the information indicating content-based forwarding. A network entity and a network system are also provided. Thus, the content-based routing is performed based on the resource identifier, and the content-based forward path is created, so that the path forwarding based on the content is realized.

19 Claims, 8 Drawing Sheets

(51) Int. Cl.
*H04L 12/701* (2013.01)
*H04L 12/721* (2013.01)
*H04L 12/723* (2013.01)

(56) References Cited

U.S. PATENT DOCUMENTS

| | | | |
|---|---|---|---|
| 6,917,610 B1* | 7/2005 | Kung et al. | 370/352 |
| 6,925,484 B2* | 8/2005 | Fujimori et al. | 709/202 |
| 7,339,937 B2* | 3/2008 | Mitra | H04L 45/00 370/255 |
| 7,945,469 B2* | 5/2011 | Cohen et al. | 705/7.14 |
| 2002/0128891 A1* | 9/2002 | McSherry | 705/8 |
| 2003/0084106 A1* | 5/2003 | Erev et al. | 709/206 |
| 2003/0099237 A1* | 5/2003 | Mitra et al. | 370/393 |
| 2003/0167340 A1* | 9/2003 | Jonsson | 709/238 |
| 2003/0236883 A1* | 12/2003 | Takeshima et al. | 709/225 |
| 2004/0044780 A1* | 3/2004 | Eastham | 709/229 |
| 2004/0167981 A1* | 8/2004 | Douglas | H04L 12/2602 709/225 |
| 2005/0021836 A1* | 1/2005 | Reed et al. | 709/238 |
| 2005/0138038 A1* | 6/2005 | Betts | H04L 67/327 |
| 2005/0152286 A1* | 7/2005 | Betts | H04L 45/02 370/255 |
| 2005/0195820 A1* | 9/2005 | Betts | H04L 45/52 370/392 |
| 2006/0013230 A1* | 1/2006 | Bosloy | H04L 45/00 370/395.42 |
| 2006/0059165 A1* | 3/2006 | Bosloy | H04L 49/355 |
| 2006/0224684 A1* | 10/2006 | Miedema et al. | 709/207 |
| 2006/0262922 A1* | 11/2006 | Margulies et al. | 379/265.12 |
| 2007/0008880 A1* | 1/2007 | Buchko | H04L 45/00 370/218 |
| 2007/0038499 A1* | 2/2007 | Margulies et al. | 705/9 |
| 2008/0101368 A1* | 5/2008 | Weinman | 370/392 |
| 2008/0198997 A1* | 8/2008 | Sterman et al. | 379/220.01 |
| 2008/0301320 A1* | 12/2008 | Morris | H04L 12/58 709/238 |

FOREIGN PATENT DOCUMENTS

| | | |
|---|---|---|
| CN | 101237376 A | 8/2008 |
| EP | 1 546 909 | 6/2005 |
| WO | WO 2004/015950 A1 | 2/2004 |
| WO | WO2004015950 A1 | 2/2004 |
| WO | WO 2004/021250 A1 | 3/2004 |
| WO | WO2005041534 A1 | 5/2005 |

OTHER PUBLICATIONS

International Search Report from P.R. China in International Application No. PCT/CN2008/073552 mailed Mar. 26, 2009.

Extended European Search Report dated (mailed) Dec. 1, 2010, issued in related Application No. 08868153.1-2413/2214369, PCT/CN2008073552, filed Dec. 17, 2008, Hauwei Technologies Co., Ltd.

Klemm A. et al, "A special-purpose peer-to-peer file sharing system for mobile ad hocnetworks," Vehicular Technology Conference, 2003. VTC 2003-Fall. 1003 IEEE 58$^{th}$ vol. 4, pp. 2758-2763 XP10702883A1.

Written Opinion of the International Searching Authority (translation) dated (mailed) Mar. 26, 2009, issued in related Application No. PCT/CN2008/073552, filed Dec. 17, 2008, Huawei Technologies Co., Ltd.

\* cited by examiner

METHOD, NETWORK ENTITY AND NETWORK SYSTEM FOR FORWARDING RESOURCES

CROSS-REFERENCE TO RELATED APPLICATIONS

This application is a continuation of International Application No. PCT/CN 2008/073552, filed on Dec. 17, 2008, which claims priority to Chinese Patent Application No. 200710032671.6, filed on Dec. 18, 2007, both of which are hereby incorporated by reference in their entireties.

FIELD OF THE TECHNOLOGY

The present invention relates to the filed of communications, and more particularly to a method, a network entity, and a network system for forwarding resources.

BACKGROUND OF THE INVENTION

During the development of IP over ATM (IPOA) technology, the multi-protocol label switching (MPLS) technology has emerged. The MPLS is a label forwarding technology for realizing Layer 3 routing and Layer 2 switching, which has been widely accepted. The operation principle of the MPLS is that one label is provided to each IP data packet, and the label determines a path and priority of the data packet. The length of the label is fixed, and is merely meaningful between the two devices for performing information switching. Before the data packet is forwarded to a path, a router compatible with the MPLS merely reads the label of the data packet, without reading an IP address and header of each data packet (thus, the network speed is accelerated), and then sends the data packet to be transferred in a virtual circuit of a frame relay or ATM, and rapidly transfers the data packet to a next hop. After receiving the data packet, a next hop router switches the label of the data packet into a label between the current router and the next hop and then forwards the data packet, and so forth, till the data packet is transferred to a destination router. As merely the label is read, and the IP address and the header of each data packet are unnecessary to read, the delay of the data packet is reduced, and meanwhile, as the transferred data packets are classified according to the quality of service (QoS) provided by the frame relay and ATM switch, the network service quality is improved significantly, and diversified services are provided.

The MPLS is an integrated IPOA technology, that is, integrating a routing function to the frame relay and ATM switch, in which data packets are transferred through a virtual circuit, and hardware switching is merely executed at OSI Layer 2 (data link layer) (software routing at Layer 3 (network layer) is replaced), which integrates the IP routing with the Layer 2 label switching. Thus, the Internet routing problem is solved, the delay time when the data packet is transferred is reduced, and the network transmission speed is increased, so that the MPLS is applicable to transfer multimedia information.

In view of the above, since the MPLS adopts label switching, the network router performs a forwarding operation simply after distinguishing the label, so as to realize the forwarding technology of Layer 3 routing and Layer 2 switching. However, the routing device of the MPLS does not perform routing based on content information of the data packet to be forwarded, so that the routing forward based on the content cannot be realized.

SUMMARY OF THE INVENTION

Accordingly, the present invention is directed to a method, a network entity, and a network system for forwarding resources, which are applicable to realize content-based routing forward.

In order to solve the above technical problems, in an embodiment, the present invention provides a method for forwarding resources. An exemplary embodiment of the method includes the following steps.

Content-based routing is performed between a resource request entity and a resource providing entity according to a resource identifier. Information indicating content-based forwarding is generated on an intermediate route entity during routing. A resource-content-based forwarding path is created between the resource request entity and the resource providing entity according to the information indicating content-based forwarding.

According to the created forwarding path, resources requested by the resource request entity are sent to the resource request entity.

Accordingly, in an embodiment, the present invention further provides a network entity, which includes a routing unit, a generating unit, and a transceiving unit.

The routing unit is configured to perform content-based routing according to a resource identifier.

The generating unit is configured to generate information indicating content-based forwarding according to a routing result of the routing unit.

The transceiving unit is configured to receive or send a resource according to the information indicating content-based forwarding generated by the generating unit.

Accordingly, in an embodiment, the present invention further provides a network system, which includes a resource request entity, a resource providing entity, a resource management entity, a first routing entity, and a second routing entity.

The resource request entity is configured to send a resource request message.

The resource providing entity is configured to provide a resource for the resource request entity.

The resource management entity is configured to save a resource identifier of the resource and information indicating a source sending the resource identifier.

The first routing entity is configured to receive the resource request message sent by the resource request entity, search for the resource identifier stored in the resource management entity and search for the second routing entity that sends the resource identifier to the resource management entity according to the resource identifier of the resource requested by the resource request entity, perform content-based routing to the second routing entity, generate first information indicating content-based forwarding, create a content-based forwarding path between the resource request entity and the second routing entity according to the first information indicating content-based forwarding, and receive or send the resource according to the created forwarding path.

The second routing entity is configured to perform content-based routing to the resource providing entity according to the resource identifier, generate second information indicating content-based forwarding, create a content-based forwarding path between the first routing entity and the resource providing entity according to the second information indicating content-based forwarding, and receive or send the resource according to the created forwarding path.

According to the embodiments of the present invention, content-based routing is performed according to a resource identifier and a content-based forwarding path is created, thereby realizing the content-based path forwarding.

DETAILED DESCRIPTION OF THE EMBODIMENTS

In order to make the objectives, technical solutions, and advantages of the present invention more comprehensible, the embodiments are further described as follows in detail with reference to the accompanying drawings.

Figure 1:
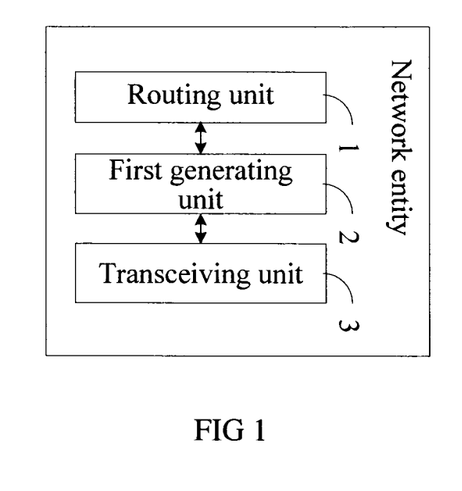
FIG. 1 is a schematic structural view of a first embodiment of a network entity according to the present invention.

In an embodiment of the present invention, a network entity is provided. FIG. 1 is a schematic structural view of a first embodiment of a network entity according to the present invention. As shown in FIG. 1, the first embodiment of the network entity according to the present invention includes a routing unit 1, a first generating unit 2, and a transceiving unit 3. The routing unit 1 is configured to perform content-based routing according to a resource identifier. The resource identifier uniquely identifies the resource. The first generating unit 2 is configured to generate information indicating content-based forwarding according to a routing result of the routing unit 1. The information indicating content-based forwarding includes a request source identifier and a content source identifier. The request source identifier is an attribute of an entity for receiving the resource from the network entity, which is one-to-one corresponding to the resource, and the content source identifier is an attribute of an entity for sending the resource to the network entity, which is one-to-one corresponding to the resource. In a specific implementation, the information indicating content-based forwarding may include a resource identifier, a request source identifier, and a content source identifier. Herein, the one-to-one correspondence means that the same network entity may transmit a plurality of resources simultaneously during the network running process, and each transmitted resource has a request source identifier or a content source identifier uniquely corresponding to the resource. The transceiving unit 3 is configured to receive or send the resource according to the information indicating content-based forwarding generated by the first generating unit 2. In a specific implementation, the resource identifier may be a resource identifier calculated by using Distributed Hash Table (DHT) or a customized label. The request source identifier and the content source identifier are respectively at least one of a customized label, an IP address, a port number and an ID.

Figure 2:
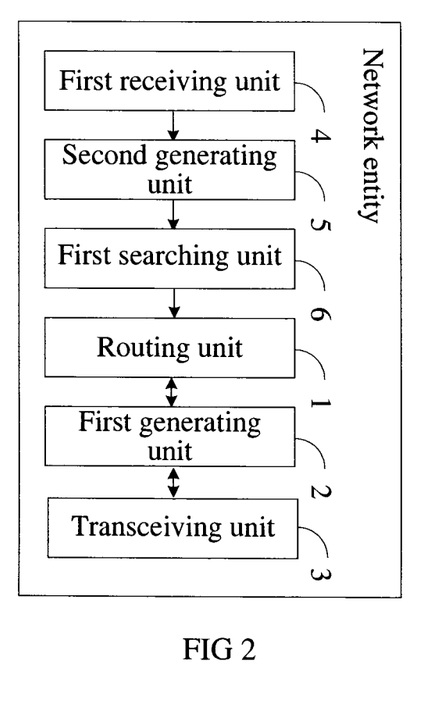
FIG. 2 is a schematic structural view of a second embodiment of a network entity according to the present invention.

FIG. 2 is a schematic structural view of a second embodiment of a network entity according to the present invention. As shown in FIG. 2, the second embodiment of the network entity according to the present invention includes a routing unit 1, a first generating unit 2, a transceiving unit 3, a first receiving unit 4, a second generating unit 5, and a first searching unit 6. In this embodiment, the functions of the routing unit 1, the first generating unit 2, and the transceiving unit 3 are the same as that in the first embodiment, and will not be repeated herein. Thus, merely the first receiving unit 4, the second generating unit 5, and the first searching unit 6 in this embodiment are described. The first receiving unit 4 is configured to receive a resource request message. The second generating unit 5 is configured to generate a resource identifier, and the resource identifier uniquely identifies the resource indicated by the resource request message received by the first receiving unit 4. The first searching unit 6 is configured to search for the corresponding resource identifier stored in the network and search for a network entity that sends the resource identifier to the network entity storing the resource identifier by taking the resource identifier generated by the second generating unit 5 as an index. In a specific implementation, the first searching unit 6 is a searching unit supporting a P2P mode or a searching unit supporting a direct searching mode, in which the direct searching mode is to perform direct searching in the network entity storing the resource identifier according to the identifier of the network entity.

Figure 3:
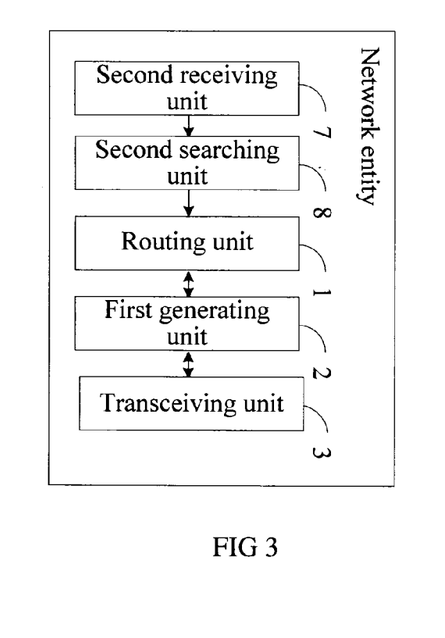
FIG. 3 is a schematic structural view of a third embodiment of a network entity according to the present invention.

FIG. 3 is a schematic structural view of a third embodiment of a network entity according to the present invention. As shown in FIG. 3, the structure of the third embodiment of the network entity according to the present invention includes a routing unit 1, a first generating unit 2, a transceiving unit 3, a second receiving unit 7, and a second searching unit 8. In this embodiment, the functions of the routing unit 1, the first generating unit 2, and the transceiving unit 3 are the same as that of the first embodiment and will not be repeated here. Thus, merely the second receiving unit 7 and the second searching unit 8 are described. The second receiving unit 7 is configured to receive a resource request message, and the resource request message includes a resource identifier of the requested resource. The second searching unit 8 is configured to search for the corresponding resource identifier stored in the network and search for a network entity that sends the resource identifier to the network entity storing the resource identifier by taking the resource identifier received by the second receiving unit 7 as an index. In specific implementation, the second receiving unit 7 may be a receiving unit supporting P2P signaling. The second searching unit 8 is a searching unit supporting a P2P mode or a searching unit supporting a direct searching mode, in which the direct searching mode is to perform direct searching in the entity storing the resource identifier according to the identifier of the entity.

Figure 4:
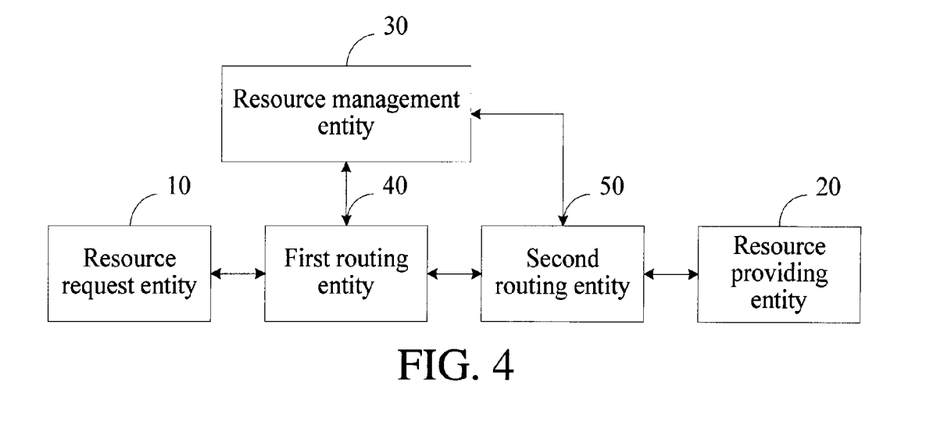
FIG. 4 is a schematic structural view of an embodiment of a network system according to the present invention.

FIG. 4 is a schematic structural view of an embodiment of a network system according to the present invention. As shown in FIG. 4, the network system according to this embodiment includes a resource request entity 10, a resource providing entity 20, a resource management entity 30, a first routing entity 40, and a second routing entity 50.

The resource request entity 10 is configured to send a resource request message. The resource request entity may be an initiating entity of the resource request or an intermediate forwarding entity of the resource request. The initiating entity and the intermediate forwarding entity may be network equipment or terminal equipment, for example, any one selected from a mobile phone, a PDA, a computer, a network server, a work station, and a digital set-top box. The resource request message may carry a resource identifier of the requested resource or may not carry the resource identifier of the requested resource.

The resource providing entity 20 is configured to provide resources for the resource request entity. The resource providing entity is an initial sending entity of the resource or an intermediate forwarding entity of the resource. The initial sending entity and the intermediate forwarding entity of the resource may be network equipment or terminal equipment, for example, any one selected from a mobile phone, a PDA, a computer, a network server, a work station, and a digital set-top box.

The resource management entity 30 is configured to save a resource identifier of the resource and information indicating a source sending the resource identifier.

The first routing entity 40 is configured to receive the resource request message sent by the resource request entity 10, search for the corresponding resource identifier stored in the resource management entity 30 and search for the second routing entity 50 that sends the resource identifier to the resource management entity 30 by using the resource identifier of the resource requested by the resource request entity 10, perform content-based routing to the second routing entity 50, generate first information indicating content-based forwarding, create a content-based forwarding path between the resource request entity 10 and the second routing entity 50, and receive or send the resource according to the first information indicating content-based forwarding.

The second routing entity 50 is configured to perform content-based routing to the resource providing entity 20 according to the resource identifier, generate second information indicating content-based forwarding, create a content-based forwarding path between the first routing entity 40 and the resource providing entity 20, and receive or send the resource according to the second information indicating content-based forwarding.

Accordingly, in an embodiment of the present invention, a method for forwarding resources is provided, which includes the following steps.

Content-based routing is performed between a resource request entity and a resource providing entity according a resource identifier, information indicating content-based forwarding is generated on an intermediate route entity during routing, and a resource-content-based forwarding path is created between the resource request entity and the resource providing entity.

The forwarding path created based on the information indicating content-based forwarding sends the resource requested by the resource request entity to the resource request entity.

The resource identifier uniquely identifies the resource requested by the resource request entity.

The information indicating content-based forwarding includes a resource identifier, a request source identifier, and a content source identifier.

Alternatively, the information indicating content-based forwarding includes a request source identifier and a content source identifier.

The request source identifier is an attribute of an entity for receiving resource from a routing entity, which is one-to-one corresponding to the resource, and the content source identifier is an attribute of an entity for sending the resource to the routing entity, which is one-to-one corresponding to the resource.

Figure 5A:
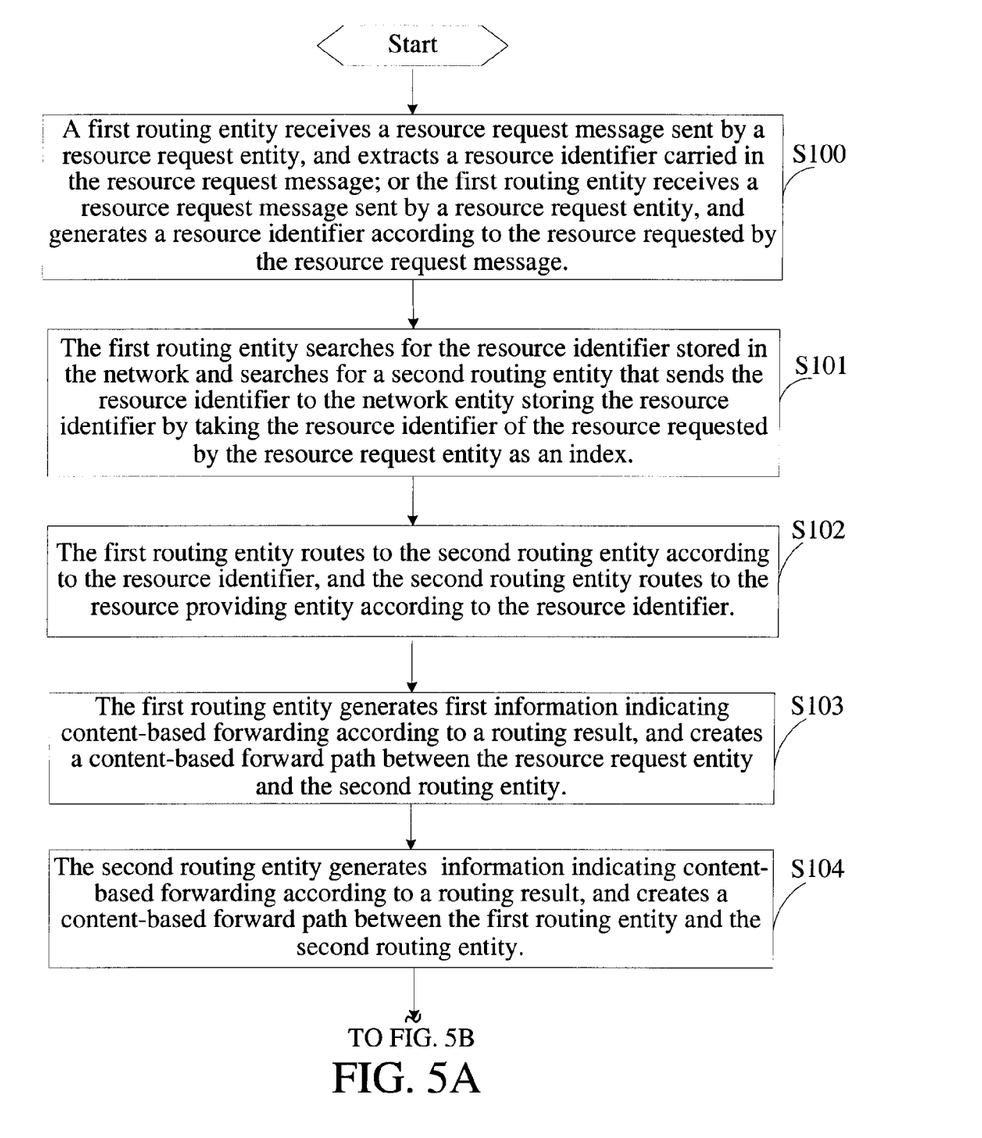
FIG. 5 is a flow chart of an embodiment of a method for forwarding resources according to the present invention.
Figure 5B:
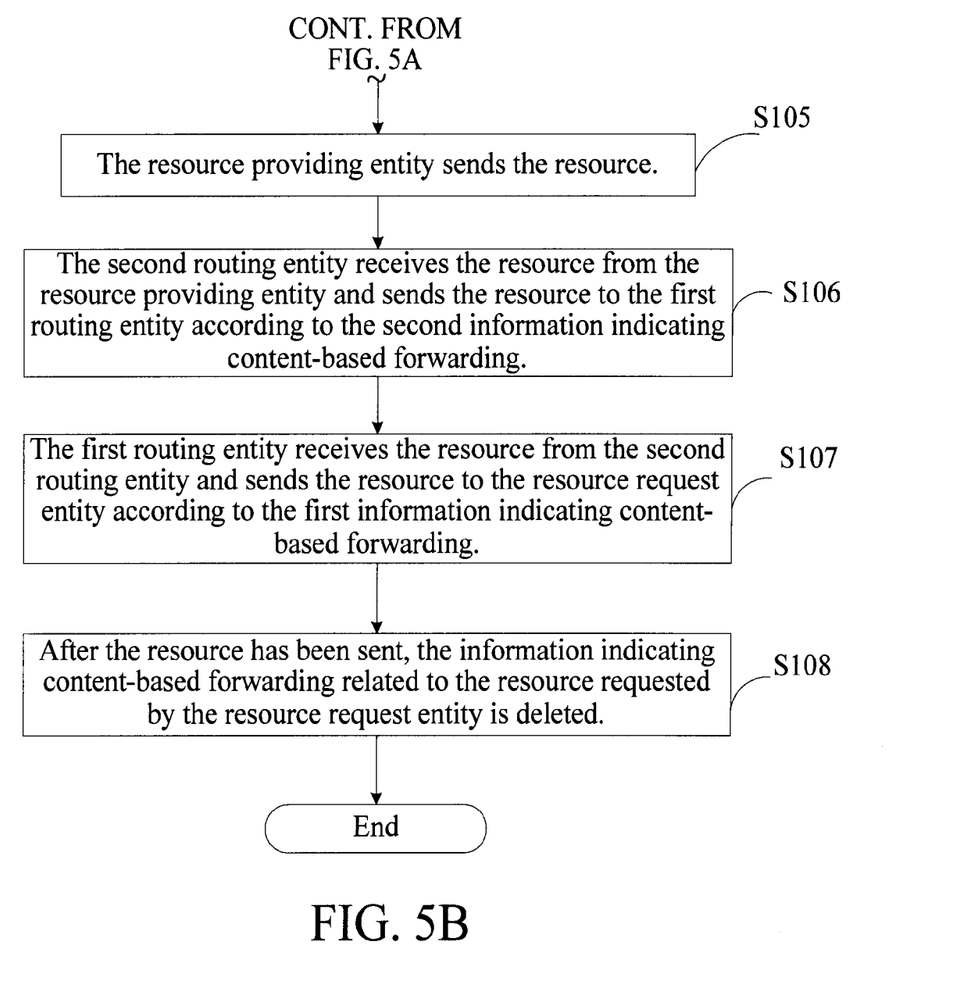

FIG. 5 is a flow chart of an embodiment of a method for forwarding resources according to the present invention. As shown in FIG. 5, the method for forwarding resources according to this embodiment specifically includes the following steps.

In Step S100, a first routing entity receives a resource request message sent by a resource request entity, and extracts a resource identifier carried in the resource request message. Alternatively, the first routing entity receives a resource request message sent by a resource request entity, and generates a resource identifier according to the resource requested by the resource request message. In specific implementation, the resource request entity may be an initiating entity of the resource request or an intermediate forwarding entity of the resource request. The initiating entity and the intermediate forwarding entity may be network equipment or terminal equipment, for example, any one selected from a mobile phone, a PDA, a computer, a network server, a work station, and a digital set-top box. The resource request entity may be an entity supporting a P2P mode or an entity not supporting a P2P mode. The resource identifier may be a resource identifier calculated by using DHT or a customized label.

In Step S101, the first routing entity searches for the corresponding resource identifier stored in the network and searches for a second routing entity that sends the resource identifier to the network entity storing the resource identifier by taking the resource identifier of the resource requested by the resource request entity as an index. In specific implementation, the searching mode may be a P2P mode or a direct searching mode, in which the direct searching mode is to perform direct searching in the entity storing the resource identifier according to the identifier of the entity.

In Step S102, the first routing entity routes to the second routing entity according to the resource identifier, and the second routing entity routes to the resource providing entity according to the resource identifier.

In Step S103, the first routing entity generates first information indicating content-based forwarding according to a routing result, and creates a content-based forwarding path between the resource request entity and the second routing entity. The request source identifier in the information indicating content-based forwarding of the first routing entity is an attribute of the resource request entity, which is one-to-one corresponding to the resource, and the content source identifier is an attribute of the second routing entity, which is one-to-one corresponding to the resource. In specific implementation, the request source identifier and the content source identifier are respectively a customized label, an IP address, a port number, an ID, and any combination thereof.

In Step S104, the second routing entity generates second information indicating content-based forwarding according to a routing result, and creates a content-based forwarding path between the first routing entity and the second routing entity. The request source identifier in the information indicating content-based forwarding of the second routing entity is an attribute of the first routing entity, which is one-to-one corresponding to the resource, and the content source identifier is an attribute of the resource providing entity, which is one-to-one corresponding to the resource. In specific implementation, the request source identifier and the content source identifier are respectively a customized label, an IP address, a port number, an ID, and any combination thereof. The resource providing entity may be an initial sending entity of the resource or an intermediate forwarding entity of the resource. The initial sending entity of the resource and the intermediate forwarding entity of the resource may be network equipment or terminal equipment, for example, any one selected from a mobile phone, a PDA, a computer, a network server, a work station, and a digital set-top box.

In Step S105, the resource providing entity sends the resource.

In Step S106, the second routing entity receives the resource from the resource providing entity and sends the resource to the first routing entity according to the second information indicating content-based forwarding.

In Step S107, the first routing entity receives the resource from the second routing entity and sends the resource to the resource request entity according to the first information indicating content-based forwarding.

In Step S108, after the resource has been sent, the information indicating content-based forwarding related to the resource requested by the resource request entity is deleted.

In specific implementation, the network entity and method for forwarding resources according to the embodiments of the present invention are applicable to various network environments, for example, a P2P Overlay network environment or other network environments supporting content-based searching and storing the resource identifiers by using a unified resource server. Hereinafter, an embodiment of the present invention is described in detail below under the P2P Overlay network environment.

Figure 6A:
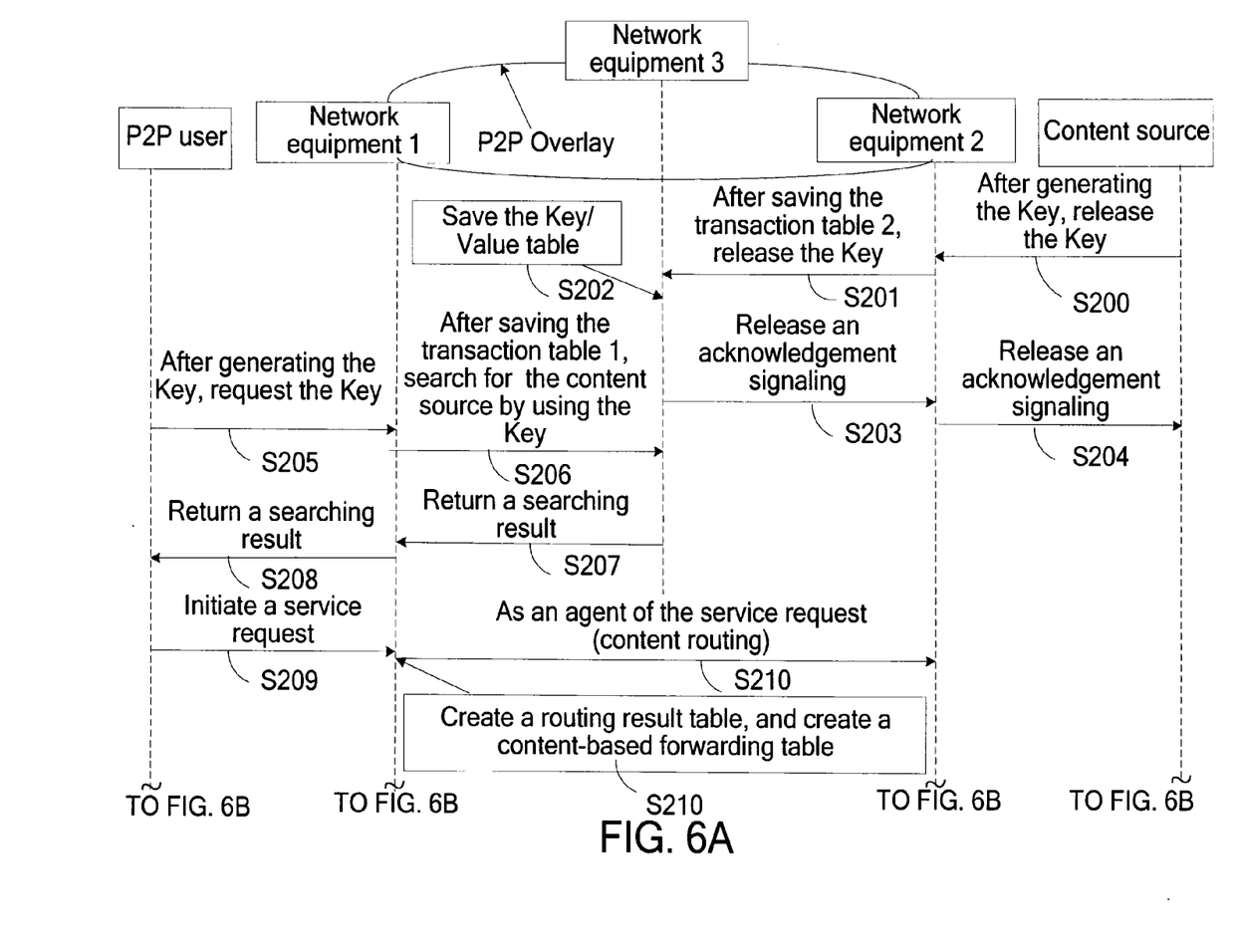
FIG. 6 is a flow chart of an embodiment of a method for forwarding resources according to the present invention under a P2P Overlay network environment.
Figure 6B:
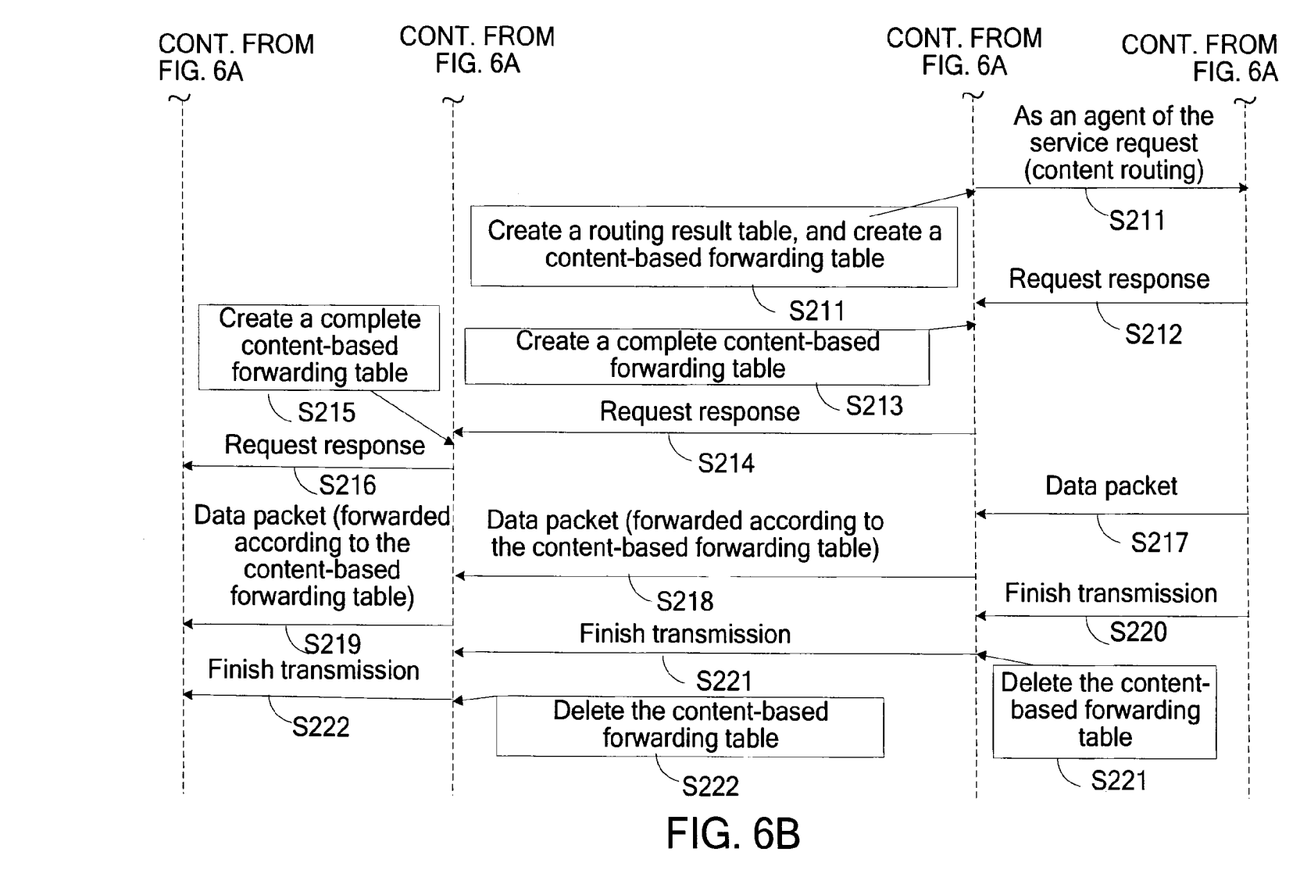

FIG. 6 is a flow chart of an embodiment of resource forwarding under a P2P Overlay network environment. As shown in FIG. 6, the network of this embodiment includes a user (representing a resource request entity), network equipment 1, network equipment 2, network equipment 3, and a content source (representing a resource providing entity). The resource request device of this embodiment supports a P2P mode. The resource forwarding process of this embodiment specifically includes the following steps.

In Step S200, the content source locally generates a Key (a resource identifier) corresponding to the resource to be released, and releases the Key to the network equipment 2 (for example, using a Put signaling).

In Step S201, the network equipment 2 locally saves a transaction table 2 (as shown in Table 1) to record the content resource that releases the Key, and releases the Key to the network equipment 3 for storing the Key according to a P2P rule.

In Step S202, the network equipment 3 locally saves a Key/Value (Value is configured to carry the resource or content description of the resource) Table (as shown in Table 1), and records that the source that releases the Key is the network equipment 2.

In Step S203, the network equipment 3 initiates a release acknowledgement signaling to the network equipment 2.

In Step S204, the network equipment 2 initiates a release acknowledgement signaling to the content source according to a transaction table 2.

TABLE 1

| Transaction table 1 | |
| --- | --- |
| Resource label | Request source label |
| Key | IP address of the user |

| Transaction table 2 | |
| --- | --- |
| Resource label | Content source label |
| Key | IP address of the content source |

TABLE 1-continued

| Key/Value table | |
| --- | --- |
| Key | IP address of the network equipment 2 |

In Step S205, the user locally generates a Key corresponding to the resource to be requested, and initiates a Key request signaling to the network equipment 1 (for example, using Get signaling).

In Step S206, the network equipment 1 locally saves a transaction table 1 (as shown in Table 1) to record the user who requests the Key, and searches for the Key in the P2P Overlay according to the P2P rule in place of the user, so as to find out the network equipment 3 storing the Key.

In Step S207, the network equipment 3 returns a searching result (the IP address of the network equipment 2) to the network equipment 1 according to the locally saved Key/Value table (as shown in Table 1).

In Step S208, the network equipment 1 returns a searching result (the IP address of the network equipment 1 itself) to the user according to the locally saved transaction table 1 (as shown in Table 1), which aims at requesting the service in place of the user, and meanwhile, the transaction table 1 is modified into Table 2.

TABLE 2

| Transaction table 1 | | |
| --- | --- | --- |
| Resource label | Request source label | Content source label |
| Key | IP address of the user | IP address of the network equipment 2 |

In Step S209, the user initiates a service session negotiation request signaling (for example, RTSP signaling or SIP signaling) to the network equipment 1, and provides a port number to be received by the user to the network equipment 1.

In Step S210, the network equipment 1 performs content-based routing as an agent of the service session negotiation request from the user according to the locally saved transaction table 1 (as shown in Table 2), creates a routing result table (as shown in Table 3), and creates a content-based forwarding table of the network equipment 1 (as shown in Table 3). However, the routing result table and the content-based forwarding table are not complete, and a port number of the network equipment 2 is to be supplemented upon subsequent request response.

TABLE 3

| | Resource label | Request source label | Content source label |
| --- | --- | --- | --- |
| Routing result table | Key | Port number + IP address of the user | Port number (absent temporarily) + IP address of the network equipment 2 |
| Content-based forwarding table | | Port number + IP address of the user | Port number (absent temporarily) + IP address of the network equipment 2 |

In Step S211, the network equipment 2 performs content-based routing as an agent of the service session negotiation request from the user according to the locally saved transaction table 2 (as shown in Table 1), creates a routing result table (as shown in Table 4), and creates a content-based forwarding table of the network equipment 2 (as shown in Table 4). However, the routing result table and the content-based forwarding table are not complete, and the port number of the content source is to be supplemented upon subsequent request response.

TABLE 4

|  | Resource label | Request source label | Content source label |
|---|---|---|---|
| Routing result table | Key | Port number + IP address of the network equipment 1 | Port number (absent temporarily) + IP address of the content source |
| Content-based forwarding table |  | Port number + IP address of the network equipment 1 | Port number (absent temporarily) + IP address of the content source |

In Step S212, the content source sends a service session negotiation request response signaling to the network equipment 2, and notifies the network equipment 2 about a port number of a data packet associated with the content to be sent by the content source.

In Step S213, the network equipment 2 adds the port number of the content source into the local content-based forwarding table, so that a complete content-based forwarding table (as shown in Table 5) is confirmed.

TABLE 5

|  | Request source label | Content source label |
|---|---|---|
| Content-based forwarding table | Port number + IP address of the network equipment 1 | Port number + IP address of the content source |

In Step S214, the network equipment 2 sends a service session negotiation request response signaling to the network equipment 1, and notifies the network equipment 1 about a port number of a data packet associated with the content to be sent by the network equipment 2.

In Step S215, the network equipment 1 adds the port number of the network equipment 2 into the local content-based forwarding table, so that a complete content-based forwarding table (as shown in Table 6) is confirmed.

TABLE 6

|  | Request source label | Content source label |
|---|---|---|
| Content-based forwarding table | Port number + IP address of the user | Port number + IP address of the network equipment 2 |

In Step S216, the network equipment 1 sends a service session negotiation request response signaling to the user. In specific implementation, after the network equipment 1 sends the service session negotiation request response signaling to the user, the user sends a session acknowledgement signaling to the network equipment 1, the network equipment 1 sends a session acknowledgement signaling to the network equipment 2, and the network equipment 2 sends a session acknowledgement signaling to the content source.

In Step S217, the content source transfers a data packet associated with the content to the network equipment 2.

In Step S218, the network equipment 2 forwards the data packet (as shown in Table 7) to the network equipment 1 according to the confirmed content-based forwarding table saved locally.

TABLE 7

|  | Content source label | Data |
|---|---|---|
| Data packet | Port number + IP address of the content source | Resource content |

In Step S219, the network equipment 1, forwards the data packet (as shown in Table 8) to the user according to the confirmed content-based forwarding table saved locally.

TABLE 8

|  | Content source label | Data |
|---|---|---|
| Data packet | Port number + IP address of the network equipment 2 | Resource content |

In Step S220, the content source sends a transmission finish signaling to the network equipment 2 after all data packets associated with the resource are transmitted.

In Step S221, the network equipment 2 deletes the local content-based forwarding table corresponding to the resource (or deletes the content forward items of the content-based forwarding table associated with the resource), and sends a transmission finish signaling to the network equipment 1.

In Step S222, the network equipment 1 deletes the local content-based forwarding table corresponding to the resource (or deletes the content forward items of the content-based forwarding table associated with the resource), and sends a transmission finish signaling to the user. In specific implementation, alternatively, the user may send a receiving finish signaling to the network equipment 1 after all the data packets associated with the resource are received, and the network equipment 1 and the network equipment 2 delete the content-based forwarding tables associated with the resource (or delete the content forward items of the content-based forwarding tables associated with the resource) respectively.

Figure 7A:
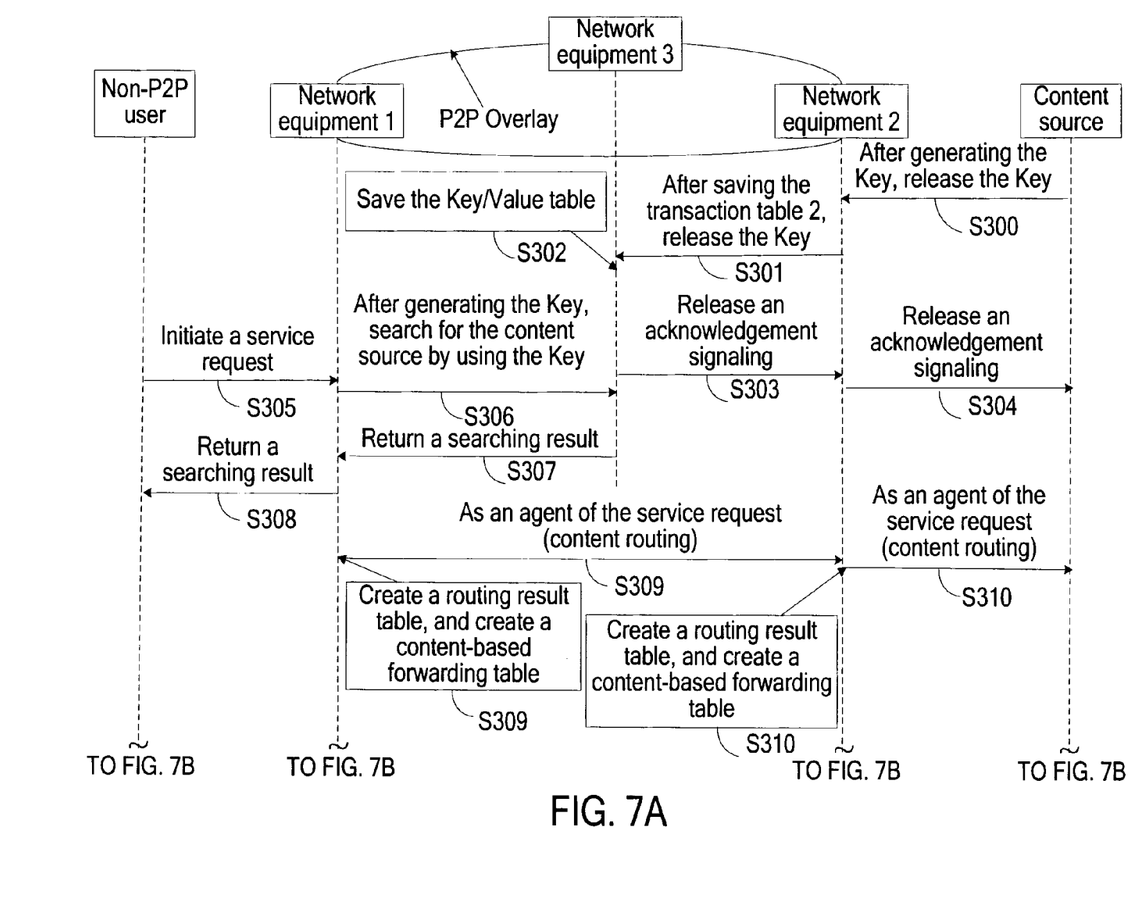
FIG. 7 is a flow chart of another embodiment of a method for forwarding resources according to the present invention under a P2P Overlay network environment.
Figure 7B:
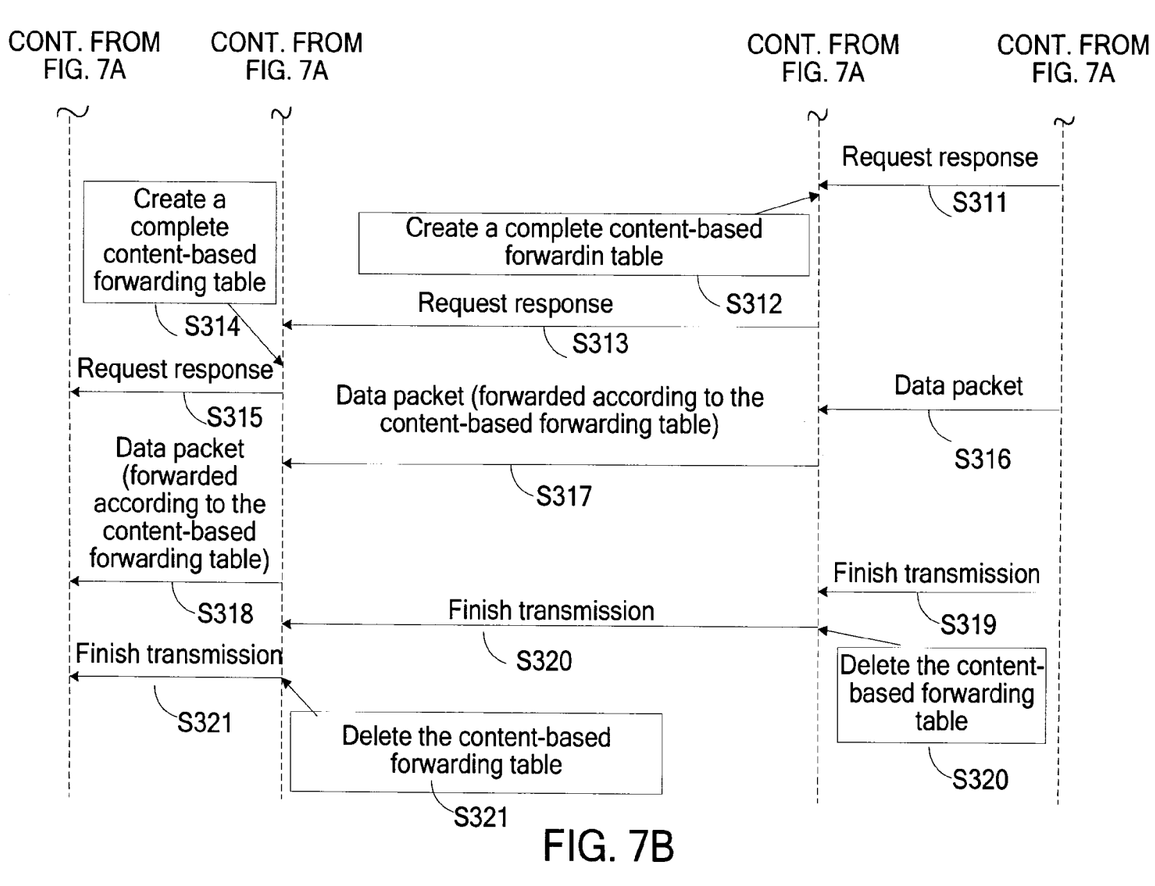

FIG. 7 is a flow chart of another embodiment of resource forwarding under a P2P Overlay network environment. As shown in FIG. 7, the network of this embodiment includes a user (representing a resource request entity), network equipment 1, network equipment 2, network equipment 3, and a content source (representing a resource providing entity), and the user in this embodiment does not support a P2P mode. As the user does not support the P2P mode, the user cannot search for the required content source by means of the P2P signaling as that mentioned in the embodiment shown in FIG. 6, but has to initiate a service session signaling to the network equipment 1 to initiate a service request. The specific resource forwarding process of this embodiment specifically includes the following steps.

In Step S300, the content source locally generates a Key corresponding to the resource to be released, and releases the Key to the network equipment 2 (for example, by using a Put signaling).

In Step S301, the network equipment 2 locally saves a transaction table 2 (as shown in Table 9) to record the content resource that releases the Key, and releases the Key to the network equipment 3 for storing the Key according to a P2P rule.

In Step S302, the network equipment 3 locally saves a Key/Value table (as shown in Table 9), and records that the source that releases the Key is the network equipment 2.

In Step S303, the network equipment 3 initiates a release acknowledgement signaling to the network equipment 2.

In Step S304, the network equipment 2 further initiates a release acknowledgement signaling to the content source according to the transaction table 2 (as shown in Table 9).

TABLE 9

Transaction table 1

| Resource label | Request source label |
|---|---|
| Key | IP address of the user |

Transaction table 2

| Resource label | Content source label |
|---|---|
| Key | IP address of the content source |

Key/Value table

| Key | IP address of the network equipment 2 |
|---|---|

In Step S305, the user initiates a service session negotiation request signaling (for example, RTSP signaling or SIP signaling) to the network equipment 1, and provides a port number to be received by the user to the network equipment 1.

In Step S306, the network equipment 1 acquires the resource indicated by the service session negotiation request from the user, and generates a Key corresponding to the resource requested by the user, and meanwhile locally saves a transaction table 1 (as shown in Table 9) to record the user who requests the Key. Additionally, the network equipment 1 saves the port number to be received by the user.

In Step S307, the network equipment 1 searches the Key in P2P Overlay according to the P2P rule in place of the user, so as to find out the network equipment 3 storing the Key.

In Step S308, the network equipment 3 returns a searching result (the IP address of the network equipment 2) to the network equipment 1 according to the locally stored Key/Value table (as shown in Table 9), and then the network equipment 1 modifies the transaction table 1 into the transaction table 1 as shown in Table 10.

TABLE 10

Transaction table 1

| Resource label | Request source label | Content source label |
|---|---|---|
| Key | IP address of the user | IP address of the network equipment 2 |

In Step S309, the network equipment 1 performs content-based routing according to the locally saved transaction table 1 (as shown in Table 10) as an agent of the service session negotiation request from the user, creates a routing result table (as shown in Table 11) according to the user port number provided in Step S306, and creates a content-based forwarding table (as shown in Table 11) of the network equipment 1. However, the routing result table and the content-based forwarding table are not complete, and a port number of the network equipment 2 is to be supplemented upon subsequent request response.

TABLE 11

| | Resource label | Request source label | Content source label |
|---|---|---|---|
| Routing result table | Key | Port number + IP address of the user | Port number (absent temporarily) + IP address of the network equipment 2 |
| Content-based forwarding table | | Port number + IP address of the user | Port number (absent temporarily) + IP address of the network equipment 2 |

In Step S310, the network equipment 2 performs content-based routing according to the locally saved transaction table 2 (as shown in Table 9) as an agent of the service session negotiation request from the user, creates a routing result table (as shown in Table 12), and creates a content-based forwarding table (as shown in Table 12) of the network equipment 2. However, the content-based forwarding table is not complete, and a port number of the content source is to be supplemented upon subsequent request response.

TABLE 12

| | Resource label | Request source label | Content source label |
|---|---|---|---|
| Routing result table | Key | Port number + IP address of the network equipment 1 | Port number (absent temporarily) + IP address of the content source |
| Content-based forwarding table | | Port number + IP address of the network equipment 1 | Port number (absent temporarily) + IP address of the content source |

In Step S311, the content source sends a service session negotiation request response signaling to the network equipment 2, and notifies the network equipment 2 about a port number of a data packet associated with the resource to be sent by the content source.

In Step S312, the network equipment 2 adds the port number of the content source into the local content-based forwarding table, so that a complete content-based forwarding table (as shown in Table 13) is confirmed.

TABLE 13

| | Request source label | Content source label |
|---|---|---|
| Content-based forwarding table | Port number + IP address of the network equipment 1 | Port number + IP address of the content source |

In Step S313, the network equipment 2 sends a service session negotiation request response signaling to the network equipment 1, and notifies the network equipment 1 about a port number of a data packet associated with the content to be sent by the network equipment 2.

In Step S314, the network equipment 1 adds the port number of the network equipment 2 into the local content-based forwarding table, so that a complete content-based forwarding table (as shown in Table 14) is confirmed.

TABLE 14

|  | Request source label | Content source label |
|---|---|---|
| Content-based forwarding table | Port number + IP address of the user | Port number + IP address of the network equipment 2 |

In Step S315, the network equipment 1 sends a service session negotiation request response signaling to the user. In specific implementation, after the network equipment 1 sends the service session negotiation request response signaling to the user, the user sends a session acknowledgement signaling to the network equipment 1, the network equipment 1 sends a session acknowledgement signaling to the network equipment 2, and the network equipment 2 sends a session acknowledgement signaling to the content source.

In Step S316, the content source transfers a data packet associated with the resource to the network equipment 2.

In Step S317, the network equipment 2 forwards the data packet (as shown in Table 15) to the network equipment 1 according to the confirmed content-based forwarding table saved locally.

TABLE 15

|  | Content source label | Data |
|---|---|---|
| Data packet | Port number + IP address of the content source | Resource content |

In Step S318, the network equipment 1 forwards the data packet (as shown in Table 16) to the user according to the confirmed content-based forwarding table saved locally.

TABLE 16

|  | Content source label | Data |
|---|---|---|
| Data packet | Port number + IP address of the network equipment 2 | Resource content |

In Step S319, the content source sends a transmission finish signaling to the network equipment 2 after all data packets associated with the content are transmitted.

In Step S320, the network equipment 2 deletes the local content-based forwarding table corresponding to the content (or deletes the content forward items in the content-based forwarding table associated with the resource), and sends a transmission finish signaling to the network equipment 1.

In Step S321, the network equipment 1 deletes the local content-based forwarding table corresponding to the content (or deletes the content forward items in the content-based forwarding table associated with the resource), and sends a transmission finish signaling to the user. In specific implementation, alternatively, the user may send a receiving finish signaling to the network equipment 1 after all data packets associated with the resource are received, and the network equipment 1 and the network equipment 2 delete the local content-based forwarding tables corresponding to the resource (or delete the content forward items in the content-based forwarding tables associated with the resource) respectively.

Under other network environments supporting content-based searching (other than the P2P environment), for example, a network includes a user (representing a resource request entity), network equipment 1, network equipment 2, network equipment 3, and a content source (representing a resource providing entity). The network equipment 3 is a unified content resource server, and is configured to store all the released resource content, which is provided for the network equipment 1 to search for the content source. In this network, when the network equipment 1 acquires the resource indicated by the service session negotiation request from the user, it may acquire the content source through other manners (for example, using the stored identifier of the network equipment 3 to find out the network equipment 3 to further search for the content source). After the content source is acquired, the subsequent data forwarding steps under this network are the same as that of the embodiment shown in FIG. 6 and will not be repeated herein.

According to the embodiments of the present invention, the content-based routing is performed according to the resource identifier, and the content-based path forwarding is realized.

The above descriptions are merely preferred embodiments of the present invention, which are not intended to limit the protection scope of the present invention. Equivalent variations may be made according to the claims of the present invention, which all fall within the scope of the present invention.

What is claimed is:

1. A Layer 2 (L2) label switching method implemented by a first routing entity for forwarding resources, comprising:
performing, by the first routing entity, content-based routing at the L2 level between a resource request entity and a resource providing entity according to a resource identifier comprised within a frame header of a received resource request message, wherein the resource identifier uniquely identifies a resource requested by the resource request entity, the first routing entity is an intermediate routing entity between the resource request entity and the resource providing entity;
generating, by the first routing entity, information indicating content-based forwarding during routing, wherein the information indicating content-based forwarding comprises a corresponding relationship between a request source identifier and a content source identifier, the request source identifier being an attribute of an entity for receiving the resource and one-to-one corresponding to the resource identifier, the content source identifier being an attribute of an entity for sending the resource and one-to-one corresponding to the resource identifier;
creating a resource-content-based forwarding path at the L2 level between the resource request entity and the resource providing entity according to the information indicating content-based forwarding;
receiving a data packet of the resource sent by the resource providing entity, wherein a header frame of the data packet carrying the content source identifier and resource content;
determining an item pertains to the information indicating content-based forwarding matching with the content source identifier carried in the header frame of the data packet, the item being identical to the content source identifier carried in the data packet;
obtaining the request source identifier in the item; and
forwarding the data packet to a request source indicated by the request source identifier in the item.

2. The method according to claim 1, wherein the performing content-based routing between the resource request entity and the resource providing entity according to the resource identifier, generating the information indicating content-based forwarding during routing, and creating the resourcecontent-based forwarding path between the resource request entity and the resource providing entity comprise:
- receiving, by the first routing entity, a resource request message sent by the resource request entity, and generating the resource identifier according to the resource requested by the resource request message;
- searching, by the first routing entity, the resource identifier stored in a network and a second routing entity that sends the resource identifier to a network entity storing the resource identifier by taking the resource identifier as an index;
- routing, by the first routing entity, to the second routing entity according to the resource identifier;
- generating, by the first routing entity, the information indicating content-based forwarding according to a routing result; and
- creating, by the first routing entity, a content-based forwarding path between the resource request entity and the second routing entity.

3. The method according to claim 1, further comprising:
- deleting the information indicating content-based forwarding, after sending the resource to the resource request entity according to the created forwarding path.

4. The method according to claim 3, wherein the performing content-based routing between the resource request entity and the resource providing entity according to the resource identifier, generating the information indicating content-based forwarding during routing, and creating the resource-content-based forwarding path between the resource request entity and the resource providing entity comprise:
- receiving, by the first routing entity, a resource request message sent by the resource request entity, and extracting the resource identifier carried in the resource request message;
- searching, by the first routing entity, the resource identifier stored in a network and a second routing entity that sends the resource identifier to a network entity storing the resource identifier by taking the resource identifier as an index;
- routing, by the first routing entity, to the second routing entity according to the resource identifier;
- generating, by the first routing entity, the information indicating content-based forwarding according to a routing result; and
- creating, by the first routing entity, a content-based forwarding path between the resource request entity and the second routing entity.

5. The method according to claim 4, wherein the first routing entity receives the data packet of the resource from the second routing entity.

6. The method according to claim 4, wherein a searching mode for the searching by the first routing entity the resource identifier stored in the network and the second routing entity that sends the resource identifier to the network entity storing the resource identifier by taking the resource identifier as an index is a point-to-point (P2P) mode or a direct searching mode, the direct searching mode being to perform direct searching in the network entity storing the resource identifier according to an identifier of the network entity.

7. The method according to claim 1, wherein the request source identifier comprises an IP address and a port number of the entity for receiving a resource, and the content source identifier comprises an IP address and a port number of the entity for sending the resource.

8. The method according to claim 1, wherein the resource request entity is an initiating entity of the resource request or an intermediate forwarding entity of the resource request; and the resource providing entity is an initial sending entity of the resource or an intermediate forwarding entity of the resource.

9. The method according to claim 1, wherein the information indicating content-based forwarding further comprises the resource identifier.

10. The method according to claim 9, wherein the request source identifier and the content source identifier are respectively at least one of a customized label, an Internet Protocol (IP) address, a port number and an identity (ID).

11. A network entity functioning as an intermediate routing entity between a resource request entity and a resource providing entity, comprising:
- a routing unit, configured to perform content-based routing at Layer 2 (L2) level between the resource request entity and the resource providing entity according to a resource identifier comprised within a frame header of a received resource request message, wherein the resource identifier uniquely identifies a resource requested by the resource request entity;
- a first generating unit, configured to generate information indicating content-based forwarding according to a routing result of the routing unit and create a resource-content-based forwarding path between the resource request entity and the resource providing entity according to the information indicating content-based forwarding, wherein the information indicating content-based forwarding comprises a corresponding relationship between a request source identifier and a content source identifier, the request source identifier being an attribute of an entity for receiving the resource and one-to-one corresponding to the resource identifier, the content source identifier being an attribute of an entity for sending the resource and one-to-one corresponding to the resource identifier; and
- a transceiver, configured to receive a data packet of the resource sent by the resource providing entity, wherein a header frame of the data packet carrying the content source identifier and resource content, determine an item pertains to the information indicating content-based forwarding matching with the content source identifier carried in the header frame of the data packet, the item being identical to the content source identifier carried in the data packet, obtain the request source identifier in the item, and forward the data packet to a request source indicated by the request source identifier in the item.

12. The network entity according to claim 11, further comprising:
- a receiving unit, configured to receive a resource request message;
- a second generating unit, configured to generate a resource identifier for the resource requested by the resource request message received by the receiving unit; and
- a first searching unit, configured to search for the resource identifier stored in a network and search for a network entity that sends the resource identifier to a network entity storing the resource identifier by taking the resource identifier generated by the second generating unit as an index; and
- wherein the routing unit is configured to perform content-based routing to the network entity that sends the resource identifier according to the resource identifier.

13. The network entity according to claim 11, wherein the first searching unit and the second searching unit support a point-to-point (P2P) mode or a direct searching mode, the direct searching mode being to perform direct searching in the network entity storing the resource identifier according to an identifier of the network entity.

14. The network entity according to claim 11, further comprising:
  a receiving unit, configured to receive a resource request message carrying the resource identifier;
  a second searching unit, configured to search for the resource identifier stored in a network and search for a network entity that sends the resource identifier to a network entity storing the resource identifier by taking the resource identifier received by the receiving unit as an index; and
  wherein the routing unit is configured to perform content-based routing to the network entity that sends the resource identifier according to the resource identifier.

15. The network entity according to claim 14, wherein the receiving unit supports a point-to-point (P2P) signaling.

16. The network entity according to claim 11, wherein the request source identifier comprises an IP address and a port number of the entity for receiving a resource, and the content source identifier comprises an IP address and a port number of the entity for sending the resource.

17. A network system, comprising:
  a resource request entity, configured to send a resource request message;
  a resource providing entity, configured to provide a resource for the resource request entity;
  a resource management entity, configured to save a resource identifier comprised within a frame header of the received resource request message of the resource and information indicating a source sending the resource identifier;
  a first routing entity, configured to receive the resource request message sent by the resource request entity, search for the resource identifier comprised within the frame header of a received resource request message which is stored in the resource management entity and search for a second routing entity that sends the resource identifier to the resource management entity according to a resource identifier of resource requested by the resource request entity, perform content-based routing to the second routing entity at a Layer 2 (L2) level, generate first information indicating content-based forwarding, create a content-based forwarding path at the L2 level between the resource request entity and the second routing entity according to the first information indicating content-based forwarding, and receive or send the resource according to the created forwarding path; and
  a second routing entity, configured to perform content-based routing at the L2 level to the resource providing entity according to the resource identifier, generate second information indicating content-based forwarding, create a content-based forwarding path between the first routing entity and the resource providing entity according to the second information indicating content-based forwarding, and receive or send the resource according to the created forwarding path between the first routing entity and the resource providing entity,
  wherein the first information indicating content-based forwarding comprises a corresponding relationship between an identifier of the resource request entity and an identifier of the second routing entity, the identifier of the resource request entity being an attribute of the resource request entity and one-to-one corresponding to the resource identifier, and the identifier of the second routing entity being an attribute of the second routing entity and one-to-one corresponding to the resource identifier;
  wherein the second information indicating content-based forwarding comprises a corresponding relationship between an identifier of the first routing entity and an identifier of the resource providing entity, the identifier of the first routing entity being an attribute of the first routing entity and one-to-one corresponding to the resource identifier, and the identifier of the resource providing entity being an attribute of the resource providing entity and one-to-one corresponding to the resource identifier.

18. The network system according to claim 17, wherein the first and second information indicating content-based forwarding further comprise the resource identifier respectively.

19. The network system according to claim 17, wherein the identifier of the resource request entity comprises an IP address and a port number of the resource request entity, and the identifier of the second routing entity comprises an IP address and a port number of the second routing entity; and
  wherein the identifier of the first routing entity comprises an IP address and a port number of the first routing entity, and the identifier of the resource providing entity comprises an IP address and a port number of the resource providing entity.

* * * * *